United States Patent [19]

Bretz

[11] Patent Number: 4,973,508

[45] Date of Patent: Nov. 27, 1990

[54] METHOD OF PRODUCING A STRUCTURAL PANEL AND PANEL PRODUCED BY THE METHOD

[75] Inventor: Erwin Bretz, Hamburg, Fed. Rep. of Germany

[73] Assignee: Messerschmitt-Boelkow-Blohm GmbH, Munich, Fed. Rep. of Germany

[21] Appl. No.: 352,134

[22] Filed: May 15, 1989

[30] Foreign Application Priority Data

May 15, 1988 [DE] Fed. Rep. of Germany ....... 3816582

[51] Int. Cl.⁵ ............................................. B32B 3/12
[52] U.S. Cl. .................................... 428/116; 156/292; 156/307.7; 427/409
[58] Field of Search ................ 428/116, 117, 118, 73; 427/409; 156/292, 307.7

[56] References Cited

U.S. PATENT DOCUMENTS

| | | | |
|---|---|---|---|
| 2,609,068 | 9/1952 | Pajak | 428/118 |
| 2,952,579 | 9/1960 | Merriman | 428/118 |
| 3,932,249 | 1/1976 | Jury et al. | 428/116 X |
| 4,025,681 | 5/1977 | Donnelly et al. | 427/409 X |
| 4,598,007 | 7/1986 | Kourtides et al. | 428/116 |

*Primary Examiner*—Henry F. Epstein
*Attorney, Agent, or Firm*—W. G. Fasse; D. H. Kane, Jr.

[57] ABSTRACT

A structural panel, for example for forming interior aircraft cabin walls, has a lightweight composite panel substrate, an aluminum sheet, adhesively bonded to the substrate, and a desired visual image or attractive colored pattern on the visible surface of the aluminum sheet. The panel is produced by first cleaning the substrate surface to be decorated; applying an adhesive layer (5) to the cleaned surface; adhering or pressing an aluminum sheet (6) onto the adhesive layer (5); curing the adhesive layer (5); cleaning the aluminum sheet (6); applying and curing a base coat layer (7); and applying a number of colored layers (8) to produce the desired visual image or pattern.

7 Claims, 1 Drawing Sheet

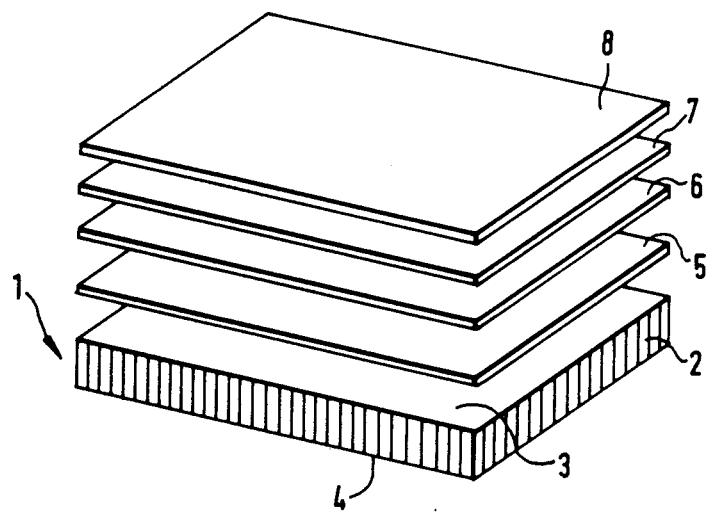

METHOD OF PRODUCING A STRUCTURAL PANEL AND PANEL PRODUCED BY THE METHOD

FIELD OF THE INVENTION

The invention relates to a method of producing a structural panel such as a visually attractive lightweight structural panel for use in partition walls or in the aircraft passenger cabins. Such panels generally have a lightweight composite panel core and a colored image or pattern applied to one of its surfaces.

BACKGROUND INFORMATION

Structural panels of this kind are generally used as cabin partition walls or side walls of storage cabinets in passenger aircraft. Such panel walls generally comprise a lightweight composite panel core with a visually attractive colorful pattern or image on the surface. The material of which these panels and especially the cover layers of these panels are made, is fiber reinforced composite material. In prior art methods, exposed surfaces which are to receive a colorful patterned coating such as a paint coating must first be prepared by the following steps: grinding the surface; filling the surface pores with a pore filling material; smoothing the filler material; grinding and polishing the filled surface; and base coating.

The various process steps for smoothing the surface of the lightweight composite panels are necessary because the respective cover layers of the composite panels comprise an uneven surface having a waviness caused by the production method of the composite panel. The waviness is caused, because the honeycomb core of the composite panel only supports the cover layers of the composite panel in the areas of the honeycomb walls and not in the hollow core spaces or voids, so that depressions or dimples are formed in the cover layer in the areas of the honeycomb voids or hollow spaces. The machining steps for planing or smoothing the surface of such panels are very time consuming and greatly increase the production costs. Making the surface of such honeycomb panels smooth also requires thicker cover layers than would be needed if the depressions or dimples may remain visible. It is a considerable disadvantage of the prior art method that the colorful attractive pattern or image layer can only be applied after the surface of the panel has been prepared in the above mentioned smoothing or planing steps if the dimples are to be avoided.

OBJECTS OF THE INVENTION

In view of the foregoing it is the aim of the invention to achieve the following objects singly or in combination:

to provide a simplified method of producing a structural panel having a smooth surface without dimples and preferably a visually attractive colored pattern or image on the surface even if the panel has a honeycomb core;

to eliminate the appearance of surface unevenness, dimples, or waviness in a panel without needing surface machining or planing steps;

to provide a method for decorating a panel surface which may be carried out relatively quickly, simply, and inexpensively so that the finished panels are inexpensive;

to allow a visually attractive surface treatment to be applied to such a panel practically simultaneously with the production of the panel, whereby the production process may be greatly accelerated; and to provide a lightweight and visually attractive structural panel made by the method of the invention.

SUMMARY OF THE INVENTION

These objects have been achieved in a method of producing a structural panel according to the invention and in a structural panel produced according to this method. The method according to the invention includes the following steps: cleaning the surface of a core or panel substrate of a structural panel having a honeycomb core with its cover layers; applying an adhesive layer to the cleaned surface of the panel substrate; adhering or pressing an aluminum sheet onto the adhesive layer applied on the structural panel substrate; curing the adhesive layer to form an adhesive bond between the aluminum sheet and the structural panel substrate; cleaning the outer surface of the aluminum sheet; applying and curing a base coat onto the clean surface of the aluminum sheet; and applying layers of color onto the base coat to produce a visually attractive pattern or colored image.

Alternatively, the visual image or colored pattern may first be applied to the aluminum sheet and then the aluminum sheet may be glued to the structural panel substrate or core. In both instances the aluminum sheet covers the undesired depressions on the panel surface.

BRIEF DESCRIPTION OF THE DRAWINGS

In order that the invention may be clearly understood, it will now be described, by way of example, with reference to the accompanying drawings, wherein the single figure is an exploded perspective view of a structural decorative panel produced according to the method of the invention.

DETAILED DESCRIPTION OF PREFERRED EXAMPLE EMBODIMENTS AND OF THE BEST MODE OF THE INVENTION

The figure shows a portion of a structural panel in an exploded perspective view. The panel may, for example, be used to form interior partition walls and storage compartment walls in passenger cabins of aircraft or other craft. The structural panel has a lightweight composite substrate 1 including a honeycomb core 2 and top and bottom cover sheets 3 and 4. In this example embodiment it will be assumed that only the top cover sheet 3 is to be provided with a colored pattern or a visually attractive image carrying an ornamental colored layer 8 on a base coat 7 on an aluminum sheet 6 bonded to the surface of the cover sheet 3 by an adhesive 5. In order to achieve this, the method of the invention is carried out by the following steps:

(a) cleaning the surface of the cover sheet 3 of the lightweight composite panel substrate 1;

(b) applying an adhesive layer 5 to the cleaned surface;

(c) adhering or pressing an aluminum sheet 6 onto the adhesive layer 5;

(d) curing the adhesive layer 5 to form an adhesive bond between the aluminum sheet 6 and the lightweight composite panel substrate 1;

(e) cleaning the top surface of the aluminum sheet 6;

(f) applying and curing a base coat layer 7; and (g) applying at least one colored layer 8 to form a visual image or attractive colored pattern. The layer 8 as such may be formed in any known manner, for example, by means of spraying, brush painting, roller coating, etc. In a variation of the above described method according to the invention, the aluminum sheet 6 is clamped into a carrying jig and the method steps (e) to (g) are carried out, whereby the desired visual image is formed on the aluminum sheet 6 before it is bonded to the panel substrate 1. In order to attach or clamp the aluminum sheet 6 to the carrying apparatus, small tabs or protrusions are provided on the aluminum sheet. In this embodiment of the invention, it is possible to produce or apply the desired visual image to the surface of the aluminum sheet while the respective structural panel is still being produced. In this manner the visual image and the structural panel are produced practically simultaneously, whereby the production throughput may be considerably accelerated. In both instances, the aluminum sheet has a thickness of about 0.3 to about 0.4 mm, which has been found sufficient to avoid the dimples in the panel surface.

The materials used to produce the structural panel as well as the visual image may be freely selected so that, for example, materials may be chosen which have optimum low toxicity and smoke development in case of fire. The panel substrates may be covered with ornaments on both sides in the manner described above for one side. Partition walls may, for example, require an ornamentation on both sides.

The aluminum sheet 6 is preferably bonded to the surface of the cover sheet 3 by an adhesive selected from the following group: Epoxide, Polyurethane, Polyester Polyamide having a curing temperature within the range of about 50° C. to about 80° C. Hereby the hardening takes place within a few hours compared to about 14 hours at 20° C.

Advantages of the invention are seen in that the aluminum sheet effectively covers the above mentioned depressions or dimples so that surface smoothing or planing operations of the substrate are avoided, thereby substantially reducing costs. Further, the lightweight composite substrate may be formed while the aluminum sheet is prepared and decorated simultaneously so that the finished product results from bonding the decorated aluminum sheet to the prepared substrate.

Although the invention has been described with reference to specific example embodiments it will be appreciated that it is intended to cover all modifications and equivalents within the scope of the appended claims.

What I claim:

1. A method of manufacturing a structural panel having a lightweight composite substrate in the form of a honeycomb core with hollow spaces in said core, and a visual image applied to at least one surface of said panel, comprising the following steps:
    (a) cleaning a surface of said substrate to form a closed surface;
    (b) applying an adhesive layer to said cleaned surface of said substrate;
    (c) applying or adhering an aluminum sheet to said adhesive layer for covering said hollow spaces;
    (d) curing said adhesive layer to form an adhesive bond between said surface and said aluminum sheet, wherein said aluminum sheet has a sufficient thickness for avoiding dimples in an outer surface of said panel even after bonding;
    (e) cleaning an outer surface of said aluminum sheet;
    (f) applying a base coat color layer to said outer surface of said aluminum sheet;
    (g) curing said base coat color layer; and
    (h) applying at least one finish color layer to produce a desired visual image.

2. The method of claim 1, wherein said step of curing said adhesive layer is a cold-curing step within the temperature range of about 20° C. to about 80° C.

3. A method of manufacturing a structural panel having a lightweight composite substrate in the form of a honeycomb core with hollow spaces in said core, and a visual image applied to at least one surface of said panel, comprising the following steps:
    (a) clamping an aluminum sheet in a carrier, said aluminum sheet having a sufficient thickness for avoiding dimples in an outer surface of said panel;
    (b) cleaning a surface of said aluminum sheet to form a cleaned surface;
    (c) applying a base coat color layer to said cleaned surface of said aluminum sheet;
    (d) curing said base coat color layer;
    (e) applying at least one finish color layer to produce a desired visual image;
    (f) cleaning a surface of said substrate to form a clean substrate surface;
    (g) applying an adhesive layer to said clean surface of said substrate;
    (h) adhering said aluminum sheet carrying said visual image to said adhesive layer so that said visual image faces away from said adhesive layer, said dimples being avoided even after said adhering of said aluminum sheet to said honeycomb core; and
    (i) curing said adhesive layer to form an adhesive bond.

4. The method of claim 3, wherein said step of curing said adhesive layer is a cold-curing step within the temperature range of about 20° C. to about 80° C.

5. A structural panel comprising a lightweight composite substrate including a honeycomb core with hollow spaces in said core, an adhesive layer on said substrate, an aluminum sheet bonded to said substrate by said adhesive layer for forming an outer surface of said panel, said aluminum sheet having a thickness sufficient to avoid dimples in said outer surface of said panel, a base coat on an outer surface of said aluminum sheet, and at least one finish color coating forming a visual image on said base coat.

6. The structural panel of claim 5, wherein said adhesive layer comprises a cold-curing adhesive.

7. The structural panel of claim 5, wherein said sufficient thickness of said aluminum sheet is within the range of 0.3 mm and 0.4 mm.

* * * * *

UNITED STATES PATENT AND TRADEMARK OFFICE
CERTIFICATE OF CORRECTION

PATENT NO. : 4,973,508

DATED : November 27, 1990

INVENTOR(S) : Bretz

It is certified that error appears in the above-identified patent and that said Letters Patent is hereby corrected as shown below:

Claim 1, line 7, (Column 3, line 63), replace "closed surface" by --cleaned surface--.

Signed and Sealed this

Seventh Day of April, 1992

Attest:

HARRY F. MANBECK, JR.

*Attesting Officer*     *Commissioner of Patents and Trademarks*